Figure 1:
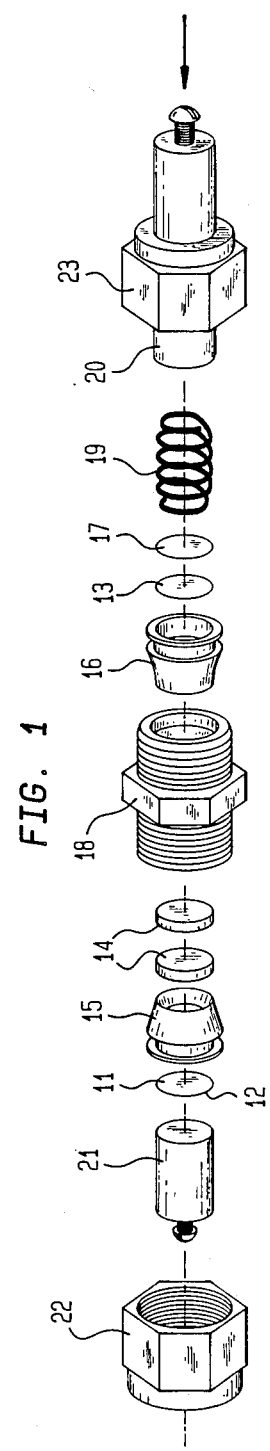

United States Patent [19]

Tarascon

[11] Patent Number: 4,710,439
[45] Date of Patent: Dec. 1, 1987

[54] SECONDARY LITHIUM BATTERY INCLUDING A LITHIUM MOLYBDATE CATHODE

[75] Inventor: Jean-Marie Tarascon, Millington, N.J.

[73] Assignee: Bell Communications Research, Inc., Livingston, N.J.

[21] Appl. No.: 917,020

[22] Filed: Oct. 9, 1986

[51] Int. Cl.⁴ ............................................. H01M 4/48
[52] U.S. Cl. .................................... 429/194; 429/218
[58] Field of Search ....................... 429/194, 197, 218

[56] References Cited

U.S. PATENT DOCUMENTS

| | | | |
|---|---|---|---|
| 3,711,334 | 1/1973 | Dey et al. | 429/197 |
| 3,808,052 | 4/1974 | Dey | 429/197 |
| 4,198,476 | 4/1980 | DiSalvo | 429/194 |
| 4,251,606 | 2/1981 | Haering et al. | 429/194 |
| 4,465,747 | 8/1984 | Evans | 429/194 |

FOREIGN PATENT DOCUMENTS 0129320 10/1979 Japan ................... 429/194

Primary Examiner—Donald L. Walton
Attorney, Agent, or Firm—James W. Falk; Edward M. Fink

[57] ABSTRACT

A non-aqueous battery is described which employs a lithium anode and a cathode of the formula $Li_xMo_2O_4$ wherein x ranges from 0.3 to 2.

3 Claims, 3 Drawing Figures

SECONDARY LITHIUM BATTERY INCLUDING A LITHIUM MOLYBDATE CATHODE

This invention relates to secondary lithium batteries. More particularly, the present invention relates to secondary lithium batteries which utilize a layered lithium molybdenum oxide as the cathode material.

During the past decade, the demand for high energy storage devices has generated considerable interest in the study of secondary rechargeable batteries and has led to the discovery of promising battery systems including ambient temperature lithium cells. Unfortunately, the practical utilization of such systems has never been realized, such being attributed to limitations imposed by electrode characteristics, namely the absence of suitable cathode materials as well as the likelihood of dendritic regrowth of lithium on anode surfaces which results in short circuiting of the cell after several cycles.

In recent years, workers in the art surmounted the cathode limitation by discovery of a new class of solid state electrode materials, commonly termed transition metal dichalcogenides such as $TiS_2$ and $VS_2$. These materials evidence an open layered structure and currently accommodate lithium reversibly, that is, the lithium may enter the structure and be readily removed therefrom. This mechanism, which is referred to as an intercalation reaction, is not limited to the layered structure referred to but also is applicable to three dimensional structures having large open channels as found in $V_6O_{13}$ and in the Chevrel phases. Despite the availability of these materials, commercial application has not been attained because of the limited cycling life of the lithium anode.

More recently, these prior art limitations were overcome by the chemical and electrochemical insertion of lithium into $Mo_6Se_6$. In my U.S. Pat. No. 4,604,334, issued on Aug. 5, 1986, a method for the preparation of $Li_xMo_6Se_6$ anodes by electrochemical fabrication of a cell comprising lithium metal as the anode and $Mo_6Se_6$ as the cathode was described. The $Li_xMo_6Se_6$ so prepared was found suitable as the anode of a secondary lithium cell. Although such anodes are of interest for commercial use, it has been determined that the overall cell capacity is often lowered, so prompting the continued search for cathode materials with high discharge/charge voltages which compensate for the smaller cell capacity.

In accordance with the present invention, this end has been successfully attained by the use of $Li_xMo_2O_4$ cathodes wherein x ranges from 0.3 to 2. Studies have revealed that the intercalation/deintercalation process in $Li_xMo_2O_4$ occurs at an average potential of 3.1 volts and that $Li/Li_xMo_2O_4$ electrochemical cells maintain their cell capacity over several cycles while sustaining high current drains. Furthermore, structural studies of the described cathodes have shown that $Li_xMo_2O_4$ is a multiphase intercalation system over the range of composition wherein x has a value from 0.3 to 2 with the presence of single phase domains which undergo hydration reactions leading to new compounds of the formula $Li_x(H_2O)_yMo_2O_4$ wherein x ranges from 0.3 to 2 and y ranges from 0.75 to 0.95.

Figure 2:
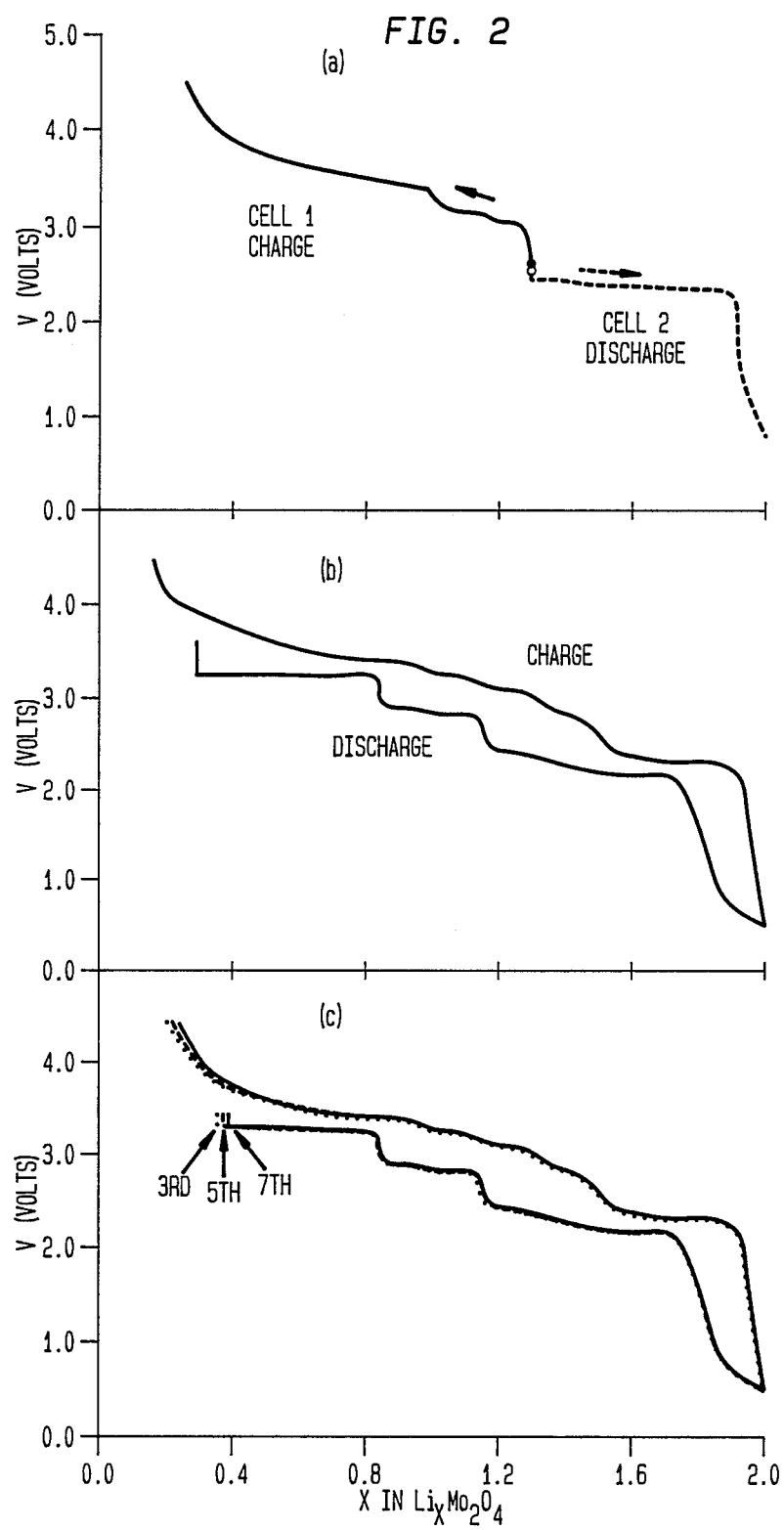

The invention will be more fully understood by reference to the following detailed description taken in conjunction with the accompanying drawing wherein:

FIG. 1 is an exploded view of a non-aqueous secondary lithium cell in accordance with the invention;

FIGS. 2(a)–2(c) are graphical representations on coordinates of lithium atoms (x) in $Li_xMo_2O_4$ against voltage showing the cycling characteristics of $Li/Li_xMo_2O_4$ electrochemical cells over a wide range of potential and over several cycles; and FIGS. 3(a)–3(d) are graphical representations on coordinates of lithium atoms (x) in $Li_xMo_2O_4$ against voltage showing the ability of the $Li/Li_xMo_2O_4$ cells to sustain high charge and discharge current densities at cycling currents ranging from 200 $\mu A/cm^2$ to 2 $mA/cm^2$.

With reference now more particularly to FIG. 1, there is shown an exploded view of a typical lithium battery of the invention. Shown is cathode 11 in powder form, disposed upon stainless steel disc 12, anode 13 and filter paper 14 which has been soaked in a suitable electrolyte such as lithium perchlorate. The structure also includes polypropylene fittings 15 and 16, steel disc 17, fitting 18, spring 19, plunger 20, stainless steel rod 21 and cap screws 22 and 23. The fittings, when compressed, provide an air tight ambient for the battery. In order to prevent electrochemical contact between plunger 20 and the various fittings in the battery, it is advantageous to coat the plunger with a suitable protective film.

In the fabrication of a lithium battery in accordance with the invention, the initial step involves the preparation of the $Li_xMo_2O_4$ cathode. This end is effected by the low temperature ion exchange of lithium for sodium in $Na_xMo_2O_4$ in accordance with the following equation:

$$Na_2MoO_4 + MoO_2 + Mo \rightarrow 1.5Na_{1.33}Mo_2O_4 \quad (I)$$

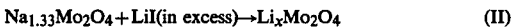

$$Na_{1.33}Mo_2O_4 + LiI(\text{in excess}) \rightarrow Li_xMo_2O_4 \quad (II)$$

The $Na_{1.33}Mo_2O_4$ obtained in accordance with Equation (I) is prepared by known techniques in vacuo at temperatures of the order of 700° C. The $Li_xMo_2O_4$ phase is obtained by thoroughly mixing powdered $Na_{1.33}Mo_2O_4$ with LiI salt which has been previously degassed in vacuum. The mixed powder is then pressed into a pellet and placed in an evacuated chamber and maintained at a temperature of approximately 300° C. for several days. Temperatures appreciably in excess of 300° C. result in the formation of a $MoO_2$ impurity phase. Following, the pellet is ground and the prior processing procedure is repeated. Then, the reaction product is washed to remove residual salts. X-ray diffraction patterns reveal the presence of a single phase product. From chemical analysis the following formula $Li_{1.33}Mo_2O_4$ was ascribed to the lithiated phase.

The $Li_{1.33}Mo_2O_4$ may then be used as cathode 11 in the preparation of a structure of the type shown in FIG. 1 wherein lithium is used as the anode 13. Specifically, electrochemical swagelock test cells are prepared in a helium atmosphere using a $Li_{1.33}Mo_2O_4$ cathode prepared as described with a lithium metal disc as the anode, the electrodes being separated by porous glass paper soaked in 0.95 m $LiClO_4$ in propylene carbonate as the electrolyte. The cells so obtained were then evaluated by equivalent charging and discharging at a constant current rate while monitoring potential as a function of time.

Two identical $Li/Li_xMo_2O_4$ electrochemical cells, designated (1) and (2), respectively, prepared as described above were cycled over a wide range of potential (0.5 to 4.5 volts). Cycling data was obtained by first charging and discharging cell 1 and cell 2 respectively from their open circuit voltage potential of 2.5 volts.

With reference now to FIG. 2(a), it may be noted that 1 lithium atom may be removed from $Li_{1.33}Mo_2O_4$ (oxidation) as the potential is elevated from 2.5 to 4.5 volts [cell (1)], while 0.7 lithium atoms may be added to $Li_{1.33}Mo_2O_4$ (reduction) as the potential is lowered from 2.5 to 0.5 volts [cell (2)]. This data clearly indicates that $Li_xMo_2O_4$ can exist over a wide range of compositions ($0.35 < X < 2$).

The behavior of cell (1) over a complete cycle is shown in FIG. 2(b). The discharge curve confirms that 1.7 lithium atoms can enter the host structure down to a potential of 0.5 volt but, more remarkably is the ability to reintercalate the 1.7 lithium atoms by recharging the cell from 0.5 to 4.5 volts. It is this reversibility characteristic that suggests the use of $Li_xMo_2O_4$ as a cathode for room temperature secondary batteries. The practical use of this material first requires charging in order to obtain the lowest possible value of x, that is, the maximum energy density. Based upon an electrochemical stoichiometry of $0.35 < X < 2$ and an average cell voltage of 3 volts, the theoretical energy density of the $Li/Li_xMo_2O_4$ cells is about 530 wh/kg of cathode material compared to 480 wh/kg for $TiS_2$ cathodes or twice as large as that of the secondary lead-acid batteries presently being marketed commercially.

The reversibility of the lithium intercalation process into $Li_xMo_2O_4$ was studied further by cycling cell (1) at a current density of 150 $\mu A/cm^2$ over seven cycles. FIG. 2(c) reveals that at this current rate the cell is readily reversible and retains its full capacity through the seventh cycle.

Figure 3:
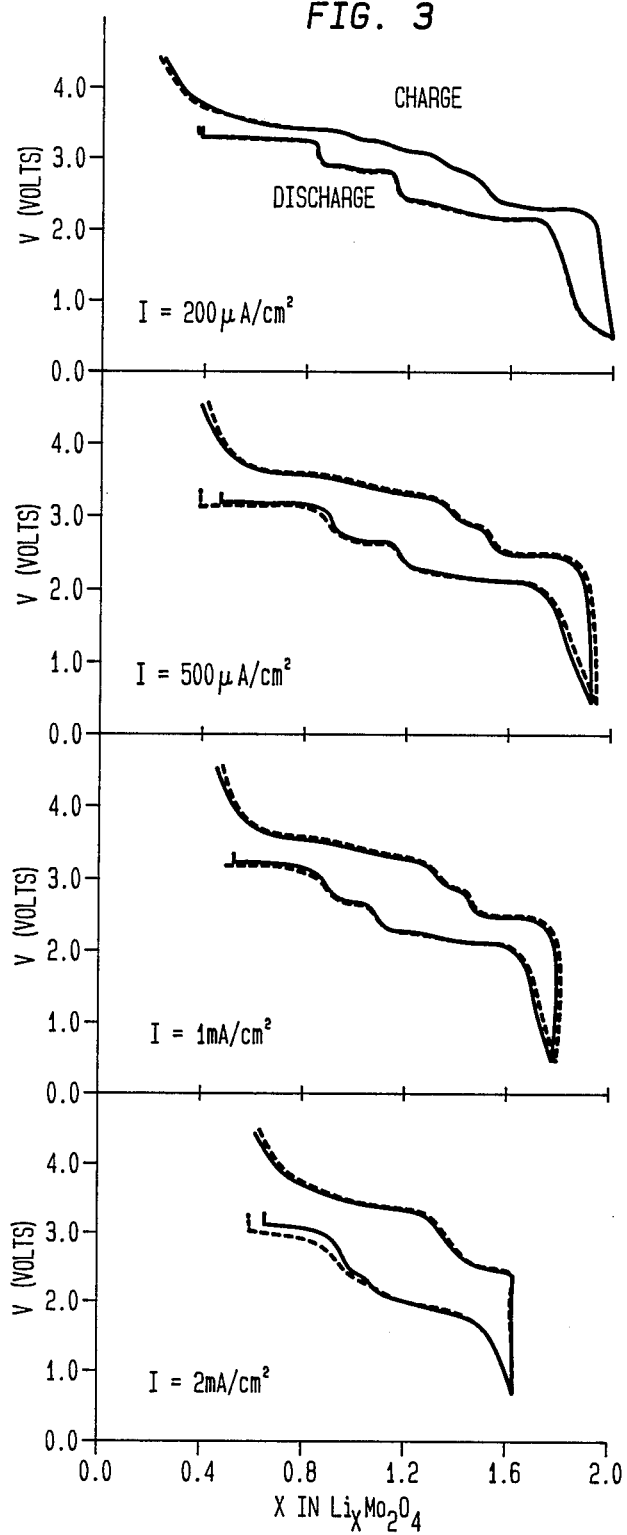

In evaluating secondary batteries, it is also important to determine the ability of the battery to sustain high charge and discharge current densities. The behavior of a $Li/Li_xMo_2O_4$ cell with respect to cycling currents ranging from 200 $\mu A/cm^2$ to 2 $mA/cm^2$ is shown in FIG. 3.

The cells tested were prepared by spreading powdered $Li_xMo_2O_4$ onto a stainless steel disk of known area. It is noted that over the range of 200 $\mu A/cm^2$ to 2 $mA/cm^2$ the lithium intercalation process was reversible. The overvoltage (difference between charge and discharge potentials) increased with a concurrent decrease in cell capacity as the current increased to 2 $mA/cm^2$ at which level the cell retains 60% of its full capacity. However, this loss in capacity is less than that measured on identical cells including $TiS_2$ cathode materials.

The following exemplary embodiment which is set forth solely for purposes of exposition describes the characteristics of the $Li/Li_xMo_2O_4$ cells.

EXAMPLE

Five grams of $Na_{1.33}Mo_2O_4$ was obtained by reaction of 99% purity $Na_2MoO_4$, 99% purity $MoO_2$ and 99.9% purity molybdenum powder at 700° C. in an evacuated electron beam welded copper tube. The $Na_{1.33}Mo_2O_4$, in powdered form was mixed with LiI salt degassed at 340° C. under a vacuum of $10^{-6}$ torr. The mixed powder was then pressed with a pellet and placed in an evacuated silicon tube. The temperature was then increased to 300° C. and maintained there at for three days. The tube was then opened, the pellet ground and again treated in the foregoing manner for an additional three days. Following, the product was washed with distilled acetonitrile to remove residual salts of lithium and sodium iodide. Atomic absorption analysis of the marked product (for lithium and sodium content) indicated complete ion exchange reaction since the amount of sodium left was less than 0.1% while the amount of lithium was equal to 3.6% by weight, so resulting in a compound of the formula $Li_{1.33}Mo_2O_4$. The x-ray diffraction pattern of the lithiated phase indicated a single phase product. All Bragg peaks were indexed on the basis of a monoclinic cell with lattice parameters being identical to those reported in the literature for single crystals of the $h-Li_{1.5}Mo_2O_4$ phase.

In light of the fact that single phases in the $Na_x$-$Mo_2O_4$ system undergo hydration, the lithiated phases obtained herein were added to water at 50° C. while stirring over a period of 48 hours. The solutions were then filtered and the solids dried with acetone and x-rayed. Thermogravimetric analysis revealed the presence of $Li_{1.33}(H_2O)_{0.95}Mo_2O_4$ $Li_2(H_2O)_{0.75}Mo_2O_4$.

While the invention has been described in detail in the foregoing specification, the aforesaid is by way of illustration only and is not restrictive in character. It will be appreciated by those skilled in the art that the processing parameters may be varied without departure from the spirit and scope of the invention. Modifications which will readily support themselves to those skilled in the art are all considered within the scope of the invention, reference being made to the appended claims.

What is claimed is:

1. A non-aqueous battery including a lithium anode, an electrolyte and a cathode, characterized in that said cathode comprises $Li_xMo_2O_4$ wherein x is an integer ranging from 0.3 to 2.

2. A battery in accordance with claim 1 wherein said cathode is $Li_{1.33}Mo_2O_4$.

3. A battery in accordance with claim 1 wherein said electrolyte is lithium perchlorate in propylene carbonate.

* * * * *

UNITED STATES PATENT AND TRADEMARK OFFICE
CERTIFICATE OF CORRECTION

PATENT NO. : 4,710,439
DATED : December 1, 1987
INVENTOR(S) : Jean-Marie Tarascon It is certified that error appears in the above-identified patent and that said Letters Patent is hereby corrected as shown below:

Column 3, line 9, that portion of the formula reading "$3Mo_2O_4$" should read --$_3Mo_2O_4$--.

Column 4, line 36, that portion of the formula reading "$Li_{1.33}(H_2O)_{0.95}Mo_2O_4Li_2(H_2O)_{0.75}Mo_2O_4.$" should read --$Li_{1.33}(H_2O)_{0.95}Mo_2O_4$ and $Li_2(H_2O)_{0.75}Mo_2O_4.$--.

Signed and Sealed this

Thirtieth Day of August, 1988

Attest:

DONALD J. QUIGG

*Attesting Officer*　　　　*Commissioner of Patents and Trademarks*